United States Patent
Zou et al.

(10) Patent No.: US 12,227,413 B2
(45) Date of Patent: Feb. 18, 2025

(54) COMPOSITE LOADED WITH NANO-MAGNESIUM HYDRIDE AND PREPARATION METHOD THEREOF

(71) Applicant: SHANGHAI JIAO TONG UNIVERSITY, Shanghai (CN)

(72) Inventors: Jianxin Zou, Shanghai (CN); Wen Zhu, Shanghai (CN); Li Ren, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 18/557,452

(22) PCT Filed: Oct. 24, 2022

(86) PCT No.: PCT/CN2022/126919
§ 371 (c)(1),
(2) Date: Oct. 26, 2023

(87) PCT Pub. No.: WO2023/071963
PCT Pub. Date: May 4, 2023

(65) Prior Publication Data
US 2024/0262684 A1   Aug. 8, 2024

(30) Foreign Application Priority Data
Oct. 25, 2021  (CN) .......................... 202111239299.2

(51) Int. Cl.
C01B 3/00   (2006.01)
(52) U.S. Cl.
CPC ................... *C01B 3/0078* (2013.01)

(58) Field of Classification Search
CPC ................................... C01B 3/0078
See application file for complete search history.

(56) References Cited

FOREIGN PATENT DOCUMENTS

| CN | 106395742 | 2/2017 |
|---|---|---|
| CN | 110436408 | 11/2019 |

(Continued)

OTHER PUBLICATIONS

PCT International Application No. PCT/CN22/126919, International Search Report, dated Jan. 16, 2023, 6 pages.
(Continued)

*Primary Examiner* — Peter F Godenschwager
(74) *Attorney, Agent, or Firm* — DLA PIPER LLP (US)

(57) ABSTRACT

Disclosed is a method for preparing a composite loaded with nano-magnesium hydride, including: adding a cationic surfactant into an aqueous dispersion of a two-dimensional transition metal carbide such that a nanosheet of the two-dimensional transition metal carbide wrinkles, to avoid re-stacking, and then washing and drying; placing a dried product into a sealed container, vacuuming the sealed container, heating to a high temperature, and holding at the high temperature for a period of time; filling the sealed container with high-pressure hydrogen and holding for a period of time to obtain a heated product; adding the heated product and dibutyl magnesium into an organic solvent, conducting ultrasonic dispersion, then heating under stirring at a hydrogen pressure of 3 MPa to 6 MPa and a temperature of 180° C. to 220° C. for 12 h to 48 h, and centrifuging and drying to obtain the composite loaded with nano-magnesium hydride.

7 Claims, 7 Drawing Sheets

(56) References Cited

FOREIGN PATENT DOCUMENTS

| | | |
|---|---|---|
| CN | 110526208 | 12/2019 |
| CN | 113830728 | 12/2021 |

OTHER PUBLICATIONS

Zhong, et al., "Magnesium hydride nanoparticles anchored on MXene sheets as high capacity anode for lithium-ion batteries," Journal of Energy Chemistry 62, 2021, pp. 431-439.

Wei, et al., "Scalable construction of SiO/wrinkled MXene composite by a simple electrostatic self-assembly strategy as anode for high-energy lithium-ion batteries," Chinese Chemical Letters 31.4, 2020, pp. 980-983.

Notification of Grant Patent Right for Invention for Chinese Patent Application No. 202111239299.2, issued Oct. 10, 2022, 3 pages.

COMPOSITE LOADED WITH NANO-MAGNESIUM HYDRIDE AND PREPARATION METHOD THEREOF

CROSS REFERENCE TO RELATED APPLICATION

This application is the National Stage filing under 35 U.S.C. 371 of International Application No. PCT/CN2022/126919, filed Oct. 24, 2022, which claims priority to Chinese patent application number 202111239299.2, filed Oct. 25, 2021, which are incorporated by reference in their entireties.

TECHNICAL FIELD

The present disclosure relates to the field of solid hydrogen storage materials, in particular to a composite loaded with nano-magnesium hydride and a preparation method thereof.

BACKGROUND

Magnesium-based solid hydrogen storage materials are considered to be the most promising solid hydrogen storage materials due to advantages such as high hydrogen storage density, excellent cycle reversibility, and abundant reserves on earth. However, magnesium-based hydrogen storage materials have too stable thermodynamic performance on hydrogen absorption and desorption (with a standard hydrogen absorption and desorption enthalpy of ±75 KJ/mol $H_2$). In general, pure magnesium hydride can achieve hydrogen desorption above 350° C., and has poor hydrogen absorption and desorption kinetics, thus greatly limiting the practical application of magnesium-based hydrogen storage materials. At present, nanostructuring is considered to be one of the most effective strategies to improve the hydrogen storage performance of the magnesium-based hydrogen storage materials. Nano-sized magnesium-based hydrogen storage materials can directly realize larger specific surface area, higher surface energy, and greater grain boundary density, which provide shorter solid-phase diffusion distance, lower diffusion energy barrier, and more diffusion channels for the diffusion of hydrogen atoms in the magnesium-based hydrogen storage materials, thereby significantly improving the hydrogen absorption and desorption kinetic performance. A large number of experimental and theoretical studies have shown that nanostructuring can also reduce the thermodynamic stability of the magnesium-based hydrogen storage materials. However, nanoscale particles tend to agglomerate and grow spontaneously due to their high surface energy, resulting in the rapid loss of nanostructure morphology and the continuous deterioration of hydrogen storage stability in magnesium-based hydrogen storage materials. Confining nanoscale magnesium hydride/magnesium in porous materials can effectively inhibit the movement, agglomeration, and growth of nanoparticles, so as to achieve stable thermodynamic and kinetic performance on hydrogen storage. Generally, carbon-based porous materials with high specific surface area, strong chemical stability, and light weight (such as porous activated carbon, carbon gel, graphene, and carbon nanotubes) are widely studied as a support material for nano-confinement. However, due to the small intrinsic catalytic effect of carbon on the hydrogen absorption and desorption of magnesium-based materials, it is difficult to achieve a high level of hydrogen absorption and desorption kinetics. Therefore, it is usually necessary to add additional catalysts to obtain higher kinetic performance of hydrogen absorption and desorption. In addition, the loading rate of magnesium hydride (magnesium) in carbon material-magnesium hydride composites is generally low. Accordingly, it is of great significance for the development of magnesium-based hydrogen storage materials to develop a support material that can not only ensure a suitable magnesium hydride/magnesium loading efficiency, but also have a desirable catalytic effect.

Two-dimensional transition metal carbides (MXenes), as emerging two-dimensional materials, have been widely studied in the fields of energy storage, catalysis, and sensors. It has a general chemical formula of $M_{n+1}X_nT_z$, in which M refers to a transition metal (such as Ti, Zr, Hf, V, Nb, Ta, Cr, and Sc), X refers to C, n is generally 1, 2, or 3, and $T_z$ refers to surface chemical groups (such as $O^{2-}$, $OH^-$, $F^-$, $NH_3$, and $NH_4^+$). Two-dimensional transition metal carbides show a large specific surface area and chemical and physical stability and have an excellent catalytic effect on the hydrogen absorption and desorption of magnesium-based hydrogen storage materials. As a result, the two-dimensional transition metal carbides are considered to be a potential support material with high loading rate and catalytic effect. However, due to the interlaminar van der Waals forces between nanosheets of the two-dimensional transition metal carbides (MXenes), such materials are prone to severe interlaminar stacking, resulting in a large loss of free surfaces for anchoring the nano-magnesium hydride. In addition, a large number of oxygen-containing functional groups on the surface of MXenes may cause serious oxidation of magnesium hydride/magnesium during hydrogen absorption and desorption at high temperatures, resulting in deterioration of hydrogen storage capacity and hydrogen absorption and desorption kinetics performance. Based on the above reasons, there are no related reports on the use of the two-dimensional transition metal carbides as a supporting material for the magnesium-based hydrogen storage materials.

In view of this, those skilled in the art are committed to developing a composite in which nano-magnesium hydride is loaded by a two-dimensional transition metal carbide, and this composite has both high magnesium hydride loading capacity and excellent hydrogen absorption and desorption kinetic performance.

SUMMARY

In view of the above-mentioned defects in the prior art, a technical problem to be solved by the present disclosure is to provide a composite in which nano-magnesium hydride is loaded by a two-dimensional transition metal carbide. The composite has excellent characteristics of high hydrogen storage capacity, rapid hydrogen absorption and desorption kinetics, and strong cycle stability.

To achieve the above object, the present disclosure provides a method for preparing a composite loaded with nano-magnesium hydride, including:

step (1): adding a cationic surfactant into an aqueous dispersion of a two-dimensional transition metal carbide such that a nanosheet of a two-dimensional transition metal carbide wrinkles and aggregates, to obtain a first wrinkled two-dimensional transition metal carbide, followed by washing and drying the first wrinkled two-dimensional transition metal carbide to obtain a first dried product;

step (2): placing the first dried product obtained from step (1) into a first sealed container, vacuuming the first sealed container, heating the first dried product to a first temperature of 600° C. to 1,000° C., and holding the first dried product at the first temperature for 2 h to 5 h to obtain a first heated product, and then filling the first sealed container with 1 MPa to 10 MPa of pressurized hydrogen and holding the first heated product for 2 h to 5 h to obtain a first product; and step (3): adding the first product obtained from step (2) and dibutyl magnesium into an organic solvent to obtain a first mixture, subjecting the first mixture to ultrasonic dispersion to obtain a first dispersion mixture, heating the first dispersion mixture under stirring at a hydrogen pressure of 3 MPa to 6 MPa and a temperature of 180° C. to 220° C. for 12 h to 48 h to obtain a first heated dispersion mixture, followed by centrifuging and drying the first heated dispersion mixture to obtain the composite loaded with nano-magnesium hydride.

In some embodiments, a pressure of the pressurized hydrogen is in a range of 3 MPa to 4.5 MPa in step (2).

In some embodiments, the two-dimensional transition metal carbide in step (1) is any one selected from the group consisting of $Ti_3C_2T_x$, $Ti_2CT_x$, $V_2CT_x$, $Mo_3C_2T_x$, $Nb_2CT_x$, $Nb_4C_3T_x$, $Ta_2CT_x$, and $V_4C_3T_x$; and $T_x$ refers to a surface chemical group, such as $O^{2-}$, $OH^-$, $F^-$, $NH_3$, and $NH^{4+}$.

In some embodiments, the aqueous dispersion of the two-dimensional transition metal carbide is a single-layer dispersion or a few-layer dispersion.

In some embodiments, the cationic surfactant in step (1) is a nitrogen-containing organic amine derivative.

In some embodiments, the cationic surfactant is cetyltrimethylammonium bromide (CTAB).

In some embodiments, in step (1), the cationic surfactant is dissolved in deionized water, and a resulting solution is then added into the aqueous dispersion of the two-dimensional transition metal carbide under stirring. The cationic surfactant is intended to wrinkle the nanosheet of the two-dimensional transition metal carbide dispersed in water, to avoid re-stacking of the nanosheet, thereby reducing the risk of interlaminar stacking during the drying.

In some embodiments, the sealed container in step (2) is a sealed stainless steel container.

In some embodiments, heating the first dried product to a first temperature of 600° C. to 1,000° C. in step (2) is conducted at a rate of 5° C./min to 10° C./min. The heating at a high temperature in step (2) is intended to remove the surfactant and oxygen-containing groups remaining in the two-dimensional transition metal carbide.

In some embodiments, the organic solvent in step (3) is one or more selected from the group consisting of cyclohexane, hexane, and heptane.

In some embodiments, the ultrasonic dispersion in step (3) is conducted at an ultrasonic power of 200 W for 2 h.

In some embodiments, a mass ratio of dibutyl magnesium to the two-dimensional transition metal carbide is adjusted so that a mass percentage of magnesium hydride in the composite is in a range of 20% to 75%.

The present disclosure further provides a method for preparing a composite loaded with nano-magnesium hydride, including:

step (1): adding acidified melamine into an aqueous dispersion of the two-dimensional transition metal carbide such that a nanosheet of a two-dimensional transition metal carbide wrinkles and aggregates, to obtain a second wrinkled two-dimensional transition metal carbide, followed by washing and drying the second wrinkled two-dimensional transition metal carbide to obtain a second dried product;

step (2): placing the second dried product obtained from step (1) into a second sealed container, vacuuming the second sealed container, heating the second dried product to a second temperature of 600° C. to 1,000° C. and holding the second dried product at the second temperature for 2 h to 5 h to obtain a second heated product, and filling the second sealed container with 1 MPa to 10 MPa of pressurized hydrogen and holding the second heated product for 2 h to 5 h to obtain a second heated product; and step (3): adding the second product obtained from step (2) and dibutyl magnesium into an organic solvent to obtain a second mixture, subjecting the second mixture to ultrasonic dispersion to obtain a second dispersion mixture, heating the second dispersion mixture under stirring at a hydrogen pressure of 3 MPa to 6 MPa and a temperature of 180° C. to 220° C. for 12 h to 48 h to obtain a second heated dispersion mixture, followed by centrifuging and drying the second heated dispersion mixture to obtain the composite loaded with nano-magnesium hydride.

The present disclosure further provides a composite loaded with nano-magnesium hydride prepared by the method as described in the above technical solutions, where nano-magnesium hydride is loaded onto a surface of the two-dimensional transition metal carbide, and the nanosheet of the two-dimensional transition metal carbide has wrinkles.

In some embodiments, a mass percentage of magnesium hydride in the composite loaded with nano-magnesium hydride is in a range of 20% to 75%.

The present disclosure further provides use of the composite loaded with nano-magnesium hydride as described in the above solutions in hydrogen storage.

Some embodiments of the present disclosure have the following technical effects:

1. Due to the van der Waals force and hydrogen bonding, the nanosheets of the two-dimensional transition metal carbide tend to stack spontaneously, resulting in a significant decrease in specific surface area. However, in some embodiments of the present disclosure, the cationic surfactant could make the nanosheet of the two-dimensional transition metal carbide wrinkle and aggregate, thereby effectively suppressing the interlaminar stacking of the nanosheets of the two-dimensional transition metal carbide and leading to more free surfaces for anchoring nano-magnesium hydride, and thus the composite has a higher loading rate of magnesium hydride.

2. Nano-magnesium hydride/magnesium shows desirable hydrogen absorption and desorption kinetics performance. However, during the continuous hydrogen absorption and desorption, nanoparticles are prone to agglomeration and growth, resulting in continuous deterioration of their cyclic stability. In the present disclosure, the nano-magnesium hydride is evenly distributed on the surface of the two-dimensional transition metal carbide by using the two-dimensional transition metal carbide as a nanoconfined carrier material; in the process of hydrogen absorption and desorption, the agglomeration and growth of magnesium hydride/magnesium particles is effectively suppressed, such that the advantages of nanostructuring are retained.

3. The nanosheet of the two-dimensional transition metal carbide has high chemical and physical stability, which ensures that the composite shows desirable structural stability and performance stability during the hydrogen absorption and desorption at high temperatures.

4. In the composite, a nano catalytic phase (such as $TiH_2$) is generated in situ at an interface between the nanosheet of the two-dimensional transition metal carbide and the nano-magnesium hydride and could accelerate the hydrogen absorption and desorption of the composite.

Therefore, in the present disclosure, by making the nanosheet of the two-dimensional transition metal carbide wrinkle, and using a confinement effect of the two-dimensional transition metal carbide on the nano-magnesium hydride/magnesium as well as an in-situ catalytic effect on the hydrogen absorption and desorption of the magnesium hydride/magnesium, the composite loaded with nano-magnesium hydride on two-dimensional transition metal carbide has high hydrogen storage density, rapid hydrogen absorption and desorption kinetics performance, and excellent cycle stability.

The concepts, specific structures, and technical effects of the present disclosure will be further described below in conjunction with the accompanying drawings, so as to fully understand the objects, features and effects of the present disclosure.

DETAILED DESCRIPTION OF THE EMBODIMENTS

Some preferred embodiments of the present disclosure will be introduced below with reference to the accompanying drawings, such that the technical contents could be understood clearly and easily. The present disclosure could be implemented by various embodiments, and the scope of the present disclosure is not limited to the embodiments mentioned herein.

A method for preparing a composite loaded with nano-magnesium hydride includes the following steps:

step (1): adding a cationic surfactant into an aqueous dispersion of the two-dimensional transition metal carbide such that a nanosheet of a two-dimensional transition metal carbide wrinkles and aggregates, to obtain a first wrinkled two-dimensional transition metal carbide, followed by washing and drying the first wrinkled two-dimensional transition metal carbide to obtain a first dried product;

step (2): placing the first dried product obtained from step (1) into a first sealed container, vacuuming the first sealed container, heating the first dried product to a first temperature of 600° C. to 1,000° C., and holding the first dried product at the first temperature for 2 h to 5 h to obtain a first heated product, and filling the first sealed container with 1 MPa to 10 MPa of pressurized hydrogen and holding the first heated product for 2 h to 5 h to obtain a first product; and step (3): adding the first product obtained from step (2) and dibutyl magnesium into an organic solvent to obtain a first mixture, subjecting the first mixture to ultrasonic dispersion to obtain a first dispersion mixture, heating the first dispersion mixture under stirring at a hydrogen pressure of 3 MPa to 6 MPa and a temperature of 180° C. to 220° C. for 12 h to 48 h to obtain a first heated dispersion mixture, followed by centrifuging and drying the first heated dispersion mixture to obtain the composite loaded with nano-magnesium hydride.

In some embodiments, the two-dimensional transition metal carbide in step (1) is any one selected from the group consisting of $Ti_3C_2T_x$, $Ti_2CT_x$, $V_2CT_x$, $Mo_3C_2T_x$, $Nb_2CT_x$, $Nb_4C_3T_x$, $Ta_2CT_x$, and $V_4C_3T_x$ ($T_x$ refers to a surface chemical group, such as $O^{2-}$, $OH^-$, $F^-$, $NH_3$, $NH^{4+}$).

In some embodiments, the cationic surfactant in step (1) is a nitrogen-containing organic amine derivative, preferably CTAB.

In some embodiments, in step (1), the cationic surfactant is dissolved in deionized water, and then added into the aqueous dispersion of the two-dimensional transition metal carbide under stirring.

In some embodiments, the sealed container in step (2) is a sealed stainless steel container.

In some embodiments, heating the first dried product to a first temperature in step (2) is conducted at a rate of 5° C./min to 10° C./min, and the first temperature after heating is 600° C., 700° C., 800° C., 900° C., or 1,000° C.

In some embodiments, the organic solvent in step (3) is selected from the group consisting of cyclohexane, hexane, heptane, and any mixture thereof.

In some embodiments, the ultrasonic dispersion in step (3) is conducted at a power of 200 W for 2 h.

In some embodiments, a mass ratio of the dibutyl magnesium to the two-dimensional transition metal carbide is adjusted so that a mass percentage of the magnesium hydride in the composite is in a range of 20% to 75%.

Example 1

Preparation of a composite 60 $MgH_2$@Ti-MX1 loaded with nano-magnesium hydride on two-dimensional transition metal carbide:

(1) 5 g of CTAB was dissolved in 100 ml of deionized water to obtain a CTAB solution;

(2) the CTAB solution prepared in step (1) was added dropwise into 500 ml of a $Ti_3C_2T_x$ aqueous dispersion with a concentration of 2 mg/ml under stirring; a resulting mixture was centrifuged and washed 3 times, and a resulting centrifuged product was freeze-dried for 72 h to obtain a dried product;

(3) the dried product obtained from step (2) was placed into a sealed stainless steel container, and the sealed stainless steel container was continuously vacuumed; after that, the dried product was heated to 800° C. at a rate of 5° C./min and held at 800° C. for 2 h; after that, the sealed stainless steel container was filled with 3 MPa of hydrogen and the resulting system was held for 2 h, and finally cooled to ambient temperature with the decrease of furnace temperature to obtain a product, denoted as Ti-MX1;

(4) 30 mg of the Ti-MX1, 3.5 ml of a solution of dibutyl magnesium in heptane with a concentration of 0.5 M, and 40 ml of cyclohexane were added into a stainless steel autoclave with a polytetrafluoroethylene liner, and a resulting mixture was subjected to probing ultrasonic dispersion for 2 h at an ultrasonic power of 200 W to obtain a dispersion mixture; and (5) the stainless steel autoclave was filled with hydrogen to a pressure of 4.5 MPa; the dispersion mixture was heated to 200° C., and reacted under stirring for 12 h; after that, a resulting reaction product was centrifuged and dried to obtain the composite 60 $MgH_2$@Ti-MX1 loaded with nano-magnesium hydride on two-dimensional transition metal carbide, with a magnesium hydride loading rate being 60 wt %.

Figure 1:
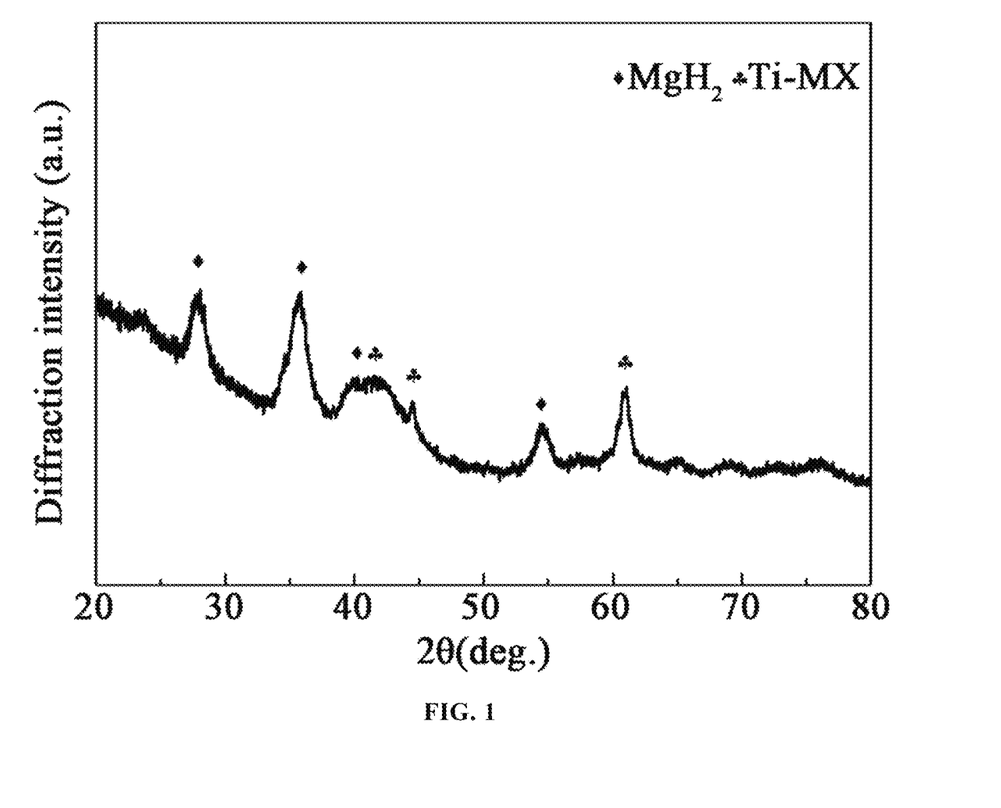
FIG. 1 shows an X-ray diffraction (XRD) pattern of a composite loaded with magnesium hydride on two-dimensional transition metal carbide according to one embodiment of the present disclosure.

An XRD pattern of the composite 60 $MgH_2$@Ti-MX prepared in this example is shown in FIG. 1. As shown in FIG. 1, a phase of the composite is mainly composed of magnesium hydride and Ti-MX.

Figure 2:
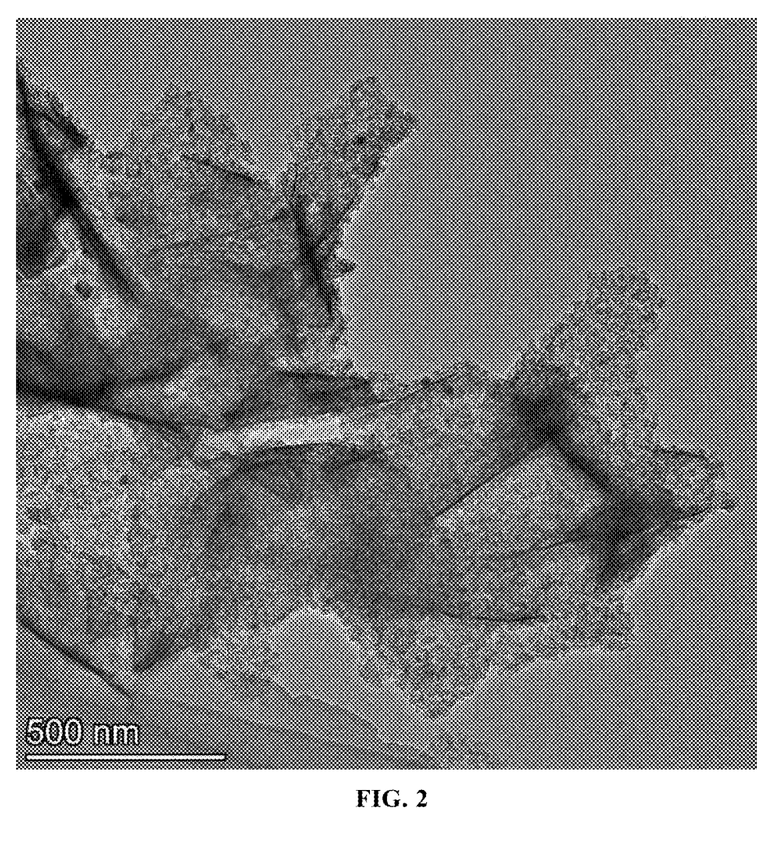
FIG. 2 shows a transmission electron microscopy (TEM) image of a composite loaded with magnesium hydride on two-dimensional transition metal carbide according to one embodiment of the present disclosure.
Figure 3:
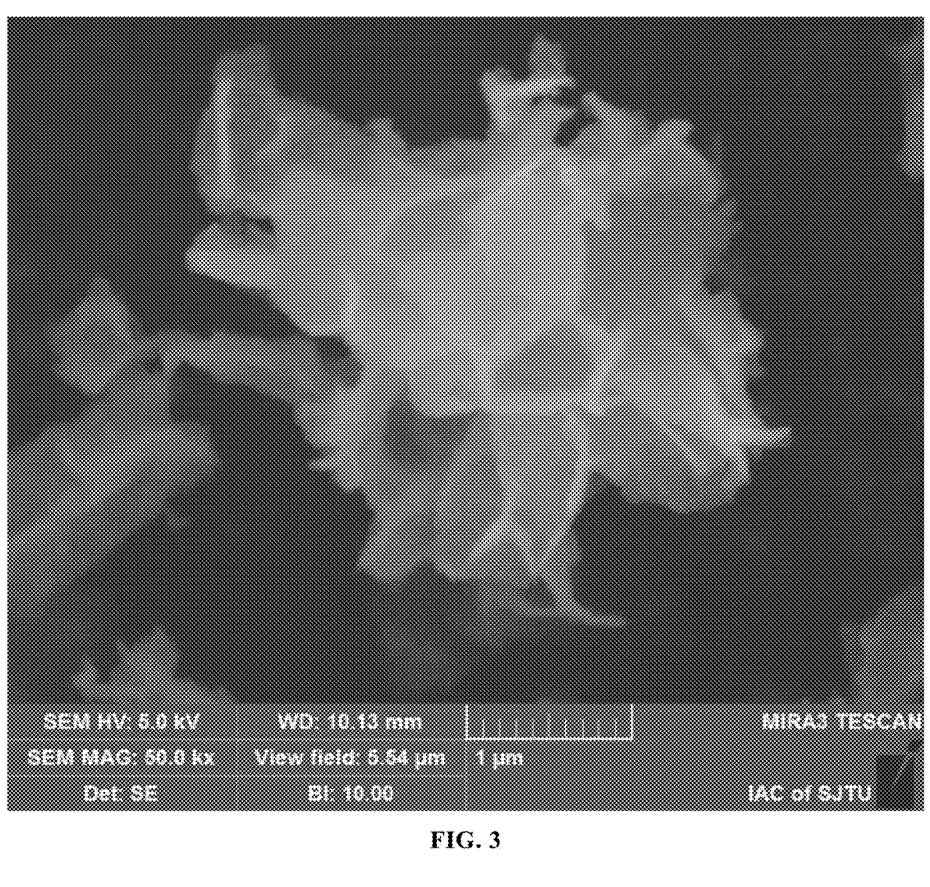
FIG. 3 shows a scanning electron microscopy (SEM) image of a composite loaded with magnesium hydride on two-dimensional transition metal carbide according to one embodiment of the present disclosure.
Figure 4:
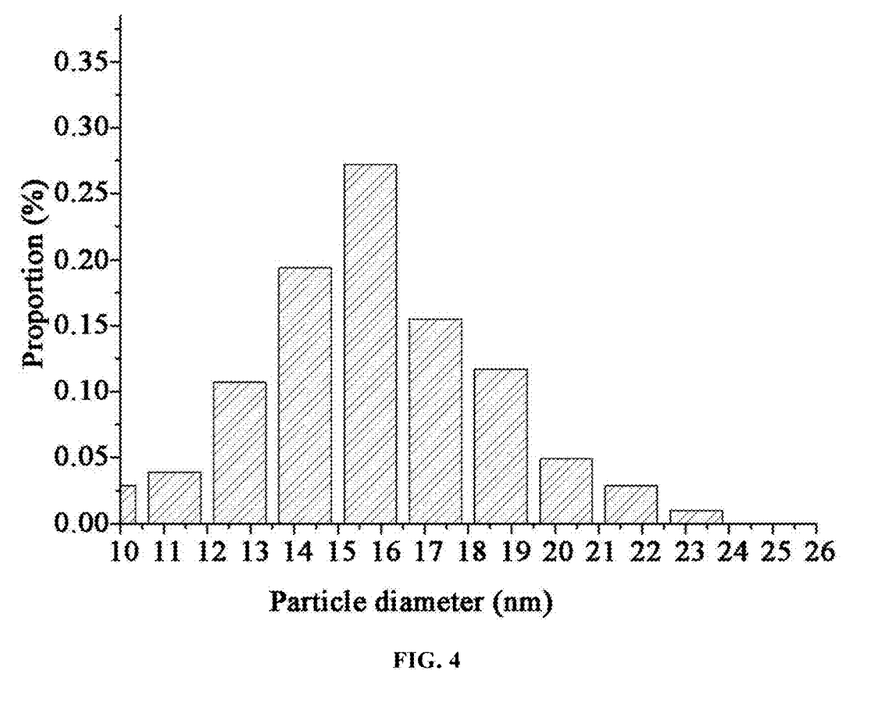
FIG. 4 shows particle size distribution of nano-magnesium hydride in a composite loaded with magnesium hydride on two-dimensional transition metal carbide according to one embodiment of the present disclosure.

A TEM image of the composite 60 $MgH_2$@Ti-MX prepared in this example is shown in FIG. 2, an SEM image of the composite 60 $MgH_2$@Ti-MX prepared in this example is shown in FIG. 3, and particle size distribution of the composite 60 $MgH_2$@Ti-MX prepared in this example is shown in FIG. 4. As shown in FIG. 2 to FIG. 4, the nanosheet of the two-dimensional transition metal carbide has wrinkles, and the nano-magnesium hydride is uniformly distributed on the surface of the two-dimensional transition metal carbide without obvious agglomeration and has an average particle size of 15 nm.

Figure 5:
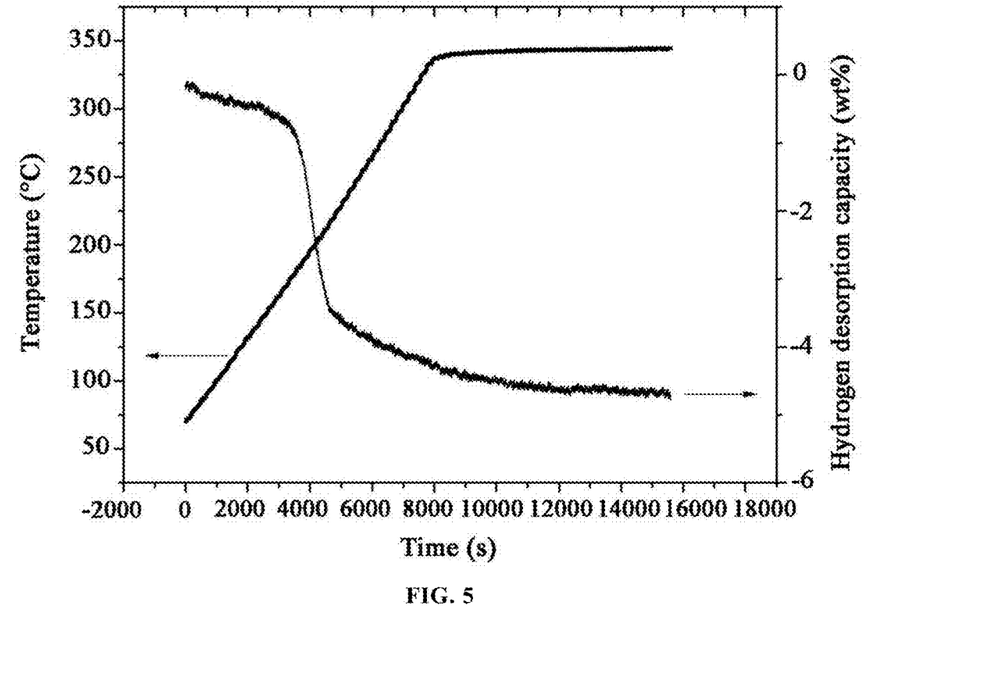
FIG. 5 shows a temperature programmed desorption curve of a composite loaded with magnesium hydride on two-dimensional transition metal carbide according to one embodiment of the present disclosure.

The composite 60 $MgH_2$@Ti-MX1 prepared in this example was tested for its hydrogen storage performance:

FIG. 5 shows a temperature programmed desorption (TPD) curve of the composite 60 $MgH_2$@Ti-MX1. As shown in FIG. 5, the composite 60 $MgH_2$@Ti-MX1 has an initial hydrogen desorption temperature of 140° C. and a hydrogen storage capacity of 4.2 wt % $H_2$.

Figure 6:
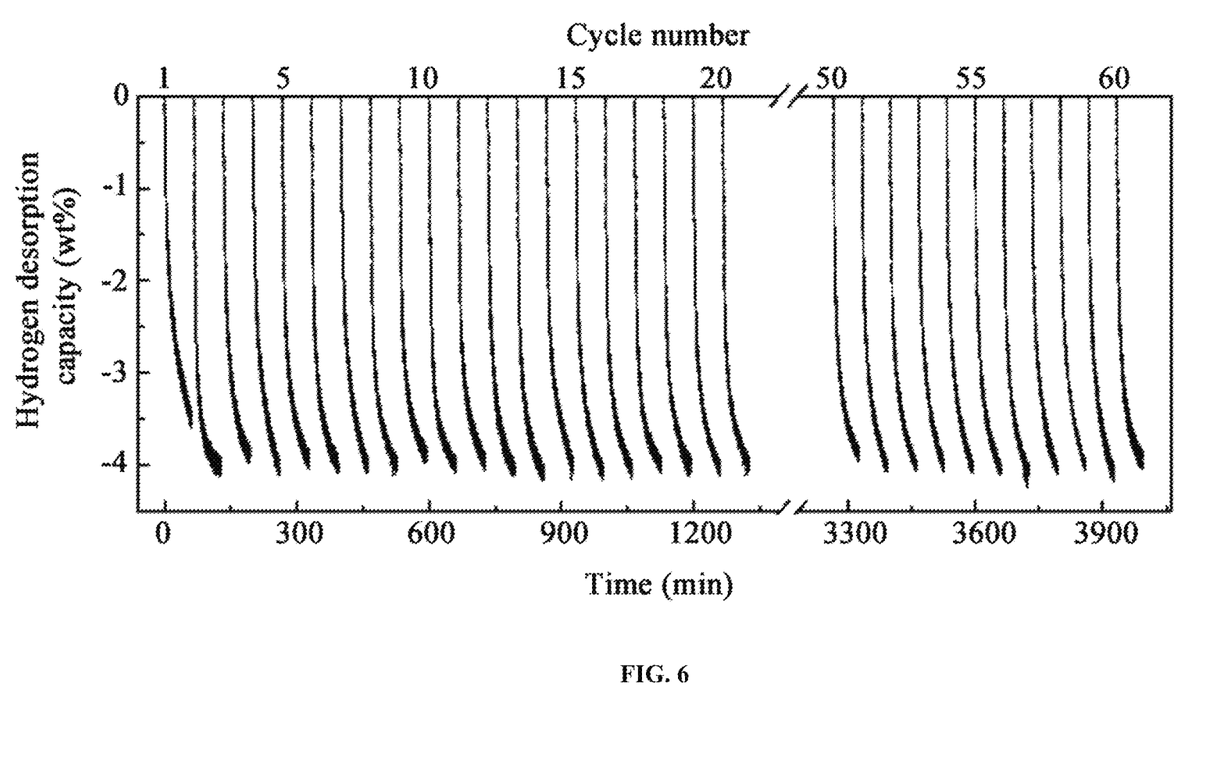
FIG. 6 shows a cycle dehydrogenation curve of a composite loaded with magnesium hydride on two-dimensional transition metal carbide according to one embodiment of the present disclosure.

FIG. 6 shows a cycle hydrogen desorption curve of the composite 60 $MgH_2$@Ti-MX1 at 200° C. As shown in FIG. 6, the composite 60 $MgH_2$@Ti-MX1 has an excellent cycle hydrogen absorption and desorption stability.

Example 2

Preparation of a composite 35 $MgH_2$@Ti-MX2 loaded with nano-magnesium hydride on two-dimensional transition metal carbide:

(1) 5 g of CTAB was dissolved in 100 ml of deionized water to obtain an CTAB solution;

(2) the CTAB solution prepared in step (1) was added dropwise into 500 ml of a $Ti_3C_2T_x$ aqueous dispersion with a concentration of 2 mg/ml under stirring; a resulting mixture was centrifuged and washed 3 times, and a resulting centrifuged product was freeze-dried for 72 h to obtain a dried product;

(3) the dried product obtained from step (2) was placed into a sealed stainless steel container, and the sealed stainless steel container was continuously vacuumed; after that, the dried product was heated to 600° C. at a rate of 5° C./min and held at 600° C. for 5 h; after that, the sealed stainless steel container was filled with 3 MPa of hydrogen, and the resulting system was held for 5 h, and finally cooled to ambient temperature with the decrease of furnace temperature to obtain a product, denoted as Ti-MX2;

(4) 30 mg of the Ti-MX2, 1.3 ml of a solution of dibutyl magnesium in heptane with a concentration of 0.5 M, and 40 ml of cyclohexane were added into a stainless steel autoclave with a polytetrafluoroethylene liner, and a resulting mixture was subjected to probing ultrasonic dispersion for 2 h at an ultrasonic power of 200 W to obtain a dispersion mixture; and (5) the stainless steel autoclave was filled with hydrogen to a pressure of 3 MPa; the dispersion mixture was heated to 180° C., and reacted under stirring for 24 h; after that, a resulting reaction product was centrifuged and dried to obtain the composite 35 $MgH_2$@Ti-MX2 loaded with nano-magnesium hydride on two-dimensional transition metal carbide, with a magnesium hydride loading rate being 35 wt %.

Figure 7:
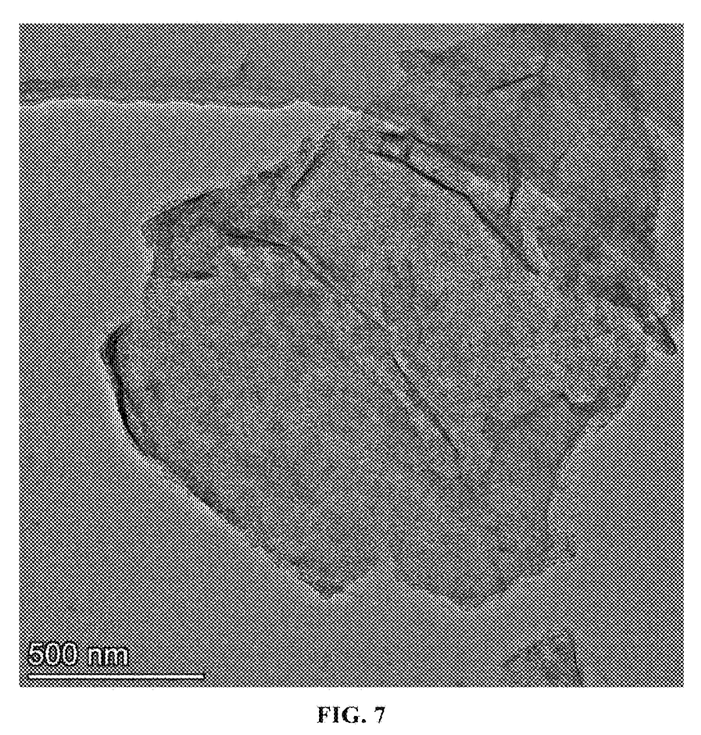
FIG. 7 shows a TEM image of a composite loaded with magnesium hydride on two-dimensional transition metal carbide according to one embodiment of the present disclosure.
Figure 8:
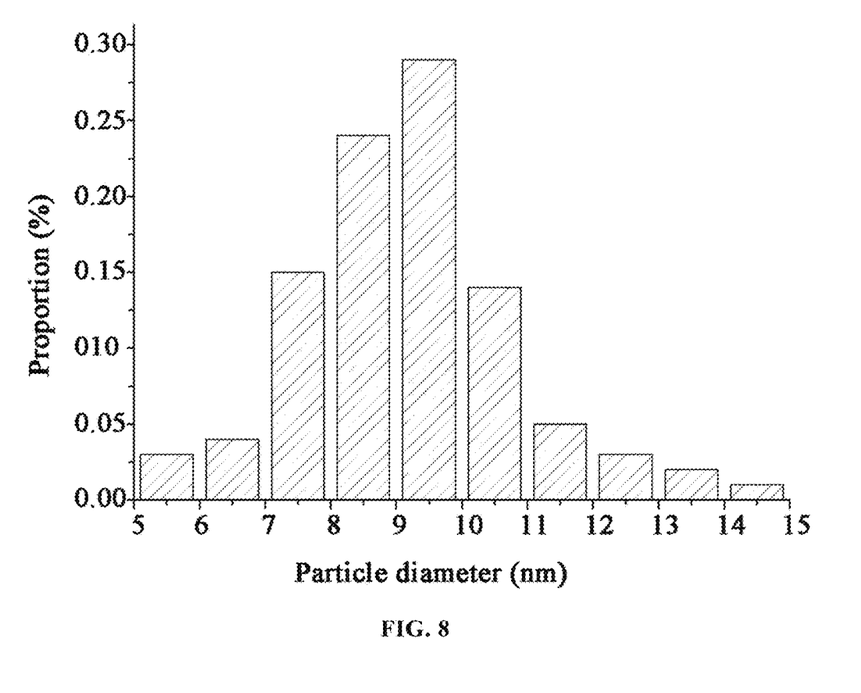
FIG. 8 shows particle size distribution of nano-magnesium hydride in a composite loaded with magnesium hydride on two-dimensional transition metal carbide according to one embodiment of the present disclosure.

A TEM image of the composite 35 $MgH_2$@Ti-MX2 prepared in this example is shown in in FIG. 7 and particle size distribution of the composite 35 $MgH_2$@Ti-MX2 prepared in this example is shown in FIG. 8. As shown in FIG. 7 to FIG. 8, the nanosheet of the two-dimensional transition metal carbide has wrinkles, and the nano-magnesium hydride in the composite 35 $MgH_2$@Ti-MX2 is uniformly distributed on the surface of the two-dimensional transition metal carbide, with an average particle size of about 8 nm.

Example 3

Preparation of a composite 60 $MgH_2$@Ti-MX3 loaded with nano-magnesium hydride on two-dimensional transition metal carbide:

(1) 1.5 g of acidified melamine was dissolved in 200 ml of deionized water to obtain a melamine solution;

(2) the melamine solution prepared in step (1) was added dropwise into 500 ml of a $Ti_3C_2T_x$ aqueous dispersion with a concentration of 2 mg/ml under stirring; a resulting mixture was centrifuged and washed 3 times, and a resulting centrifuged product was freeze-dried for 72 h to obtain a dried product;

(3) the dried product obtained from step (2) was placed into a sealed stainless steel container, and the sealed stainless steel container was continuously vacuumed; after that, the dried product was heated to 1,000° C. at a rate of 10° C./min and held at 1,000° C. for 3 h; after that, the sealed stainless steel container was filled with 4.5 MPa of hydrogen and the resulting system was held for 2 h, and finally cooled to ambient temperature with the decrease of furnace temperature to obtain a product, denoted as Ti-MX3;

(4) 30 mg of the Ti-MX3, 3.5 ml of a solution of dibutyl magnesium in heptane with a concentration of 0.5M, and 40 ml of cyclohexane were added into a stainless steel autoclave with a polytetrafluoroethylene liner, and a resulting mixture was subjected to probing ultrasonic dispersion for 2 h at an ultrasonic power of 200 W to obtain a dispersion mixture; and (5) the stainless steel autoclave was filled with hydrogen to a pressure of 6 MPa; the dispersion mixture was heated to 220° C., and reacted under stirring for 12 h; after that, a resulting reaction product was centrifuged and dried to obtain the composite 60 MgH$_2$@Ti-MX3 loaded with nano-magnesium hydride on two-dimensional transition metal carbide, with a magnesium hydride loading rate being 60 wt %.

Figure 9:
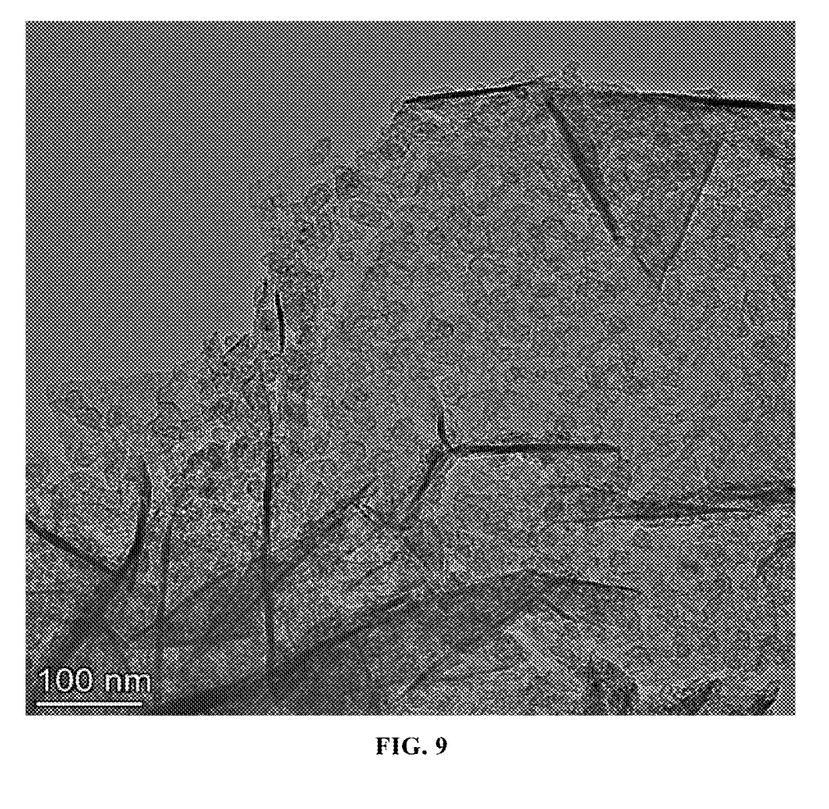
FIG. 9 shows a TEM image of a composite loaded with magnesium hydride on two-dimensional transition metal carbide according to one embodiment of the present disclosure.

A TEM image of the composite 60 MgH$_2$@Ti-MX3 prepared in this example is shown in FIG. 9. As shown in FIG. 9, the nanosheet of the two-dimensional transition metal carbide has wrinkles, and the nano-magnesium hydride in the composite 60 MgH$_2$@Ti-MX3 is uniformly distributed on the surface of the two-dimensional transition metal carbide, with an average particle size of about 17 nm.

The foregoing is detailed description of the preferred specific embodiments of the present disclosure. It should be understood that for a person of ordinary skill in the art, various modifications and variations could be made according to the concept of the present disclosure without creative efforts. Therefore, all technical solutions that could be made by a person skilled in the art based on the prior art through logical analysis, reasoning, or finite experiments according to the concept of the present disclosure shall fall within the scope defined by the appended claims.

What is claimed is:

1. A method for preparing a composite loaded with nano-magnesium hydride, comprising:
   step (1):
   adding a cationic surfactant into an aqueous dispersion of a two-dimensional transition metal carbide such that a nanosheet of the two-dimensional transition metal carbide wrinkles, to obtain a wrinkled two-dimensional transition metal carbide, and
   washing and drying the wrinkled two-dimensional transition metal carbide to obtain a dried product;
   step (2):
   placing the dried product obtained from step (1) into a sealed container, vacuuming the sealed container, heating the dried product to a temperature of 600° C. to 1,000° C., and holding the dried product at the temperature for 2 h to 5 h to obtain a heated product, and
   filling the sealed container with 1 MPa to 10 MPa of hydrogen and holding the heated product for 2 h to 5 h to obtain a product; and
   step (3):
   adding the product obtained from step (2) and dibutyl magnesium into an organic solvent to obtain a mixture,
   subjecting the mixture to ultrasonic dispersion to obtain a dispersion mixture,
   heating the dispersion mixture under stirring at a hydrogen pressure of 3 MPa to 6 MPa and a temperature of 180° C. to 220° C. for 12 h to 48 h to obtain a heated dispersion mixture, and
   centrifuging and drying the heated dispersion mixture to obtain the composite loaded with nano-magnesium hydride.

2. The method for preparing a composite loaded with nano-magnesium hydride of claim 1, wherein the cationic surfactant is a nitrogen-containing organic amine derivative.

3. The method for preparing a composite loaded with nano-magnesium hydride of claim 2, wherein the nitrogen-containing organic amine derivative is cetyltrimethylammonium bromide (CTAB).

4. The method for preparing a composite loaded with nano-magnesium hydride of claim 1, wherein in step (1), the cationic surfactant is dissolved in deionized water, and a resulting solution is then added into the aqueous dispersion of the two-dimensional transition metal carbide under stirring.

5. The method for preparing a composite loaded with nano-magnesium hydride of claim 1, wherein heating the dried product to a temperature of 600° C. to 1,000° C. in step (2) is conducted at a rate of 5° C./min to 10° C./min.

6. The method for preparing a composite loaded with nano-magnesium hydride of claim 1, wherein the organic solvent in step (3) comprises one or more selected from the group consisting of cyclohexane, hexane, and heptane.

7. A method for preparing a composite loaded with nano-magnesium hydride, comprising:
   step (1):
   adding acidified melamine into an aqueous dispersion of a two-dimensional transition metal carbide such that a nanosheet of the two-dimensional transition metal carbide wrinkles, to obtain a wrinkled two-dimensional transition metal carbide, and
   washing and drying the wrinkled two-dimensional transition metal carbide to obtain a dried product;
   step (2):
   placing the dried product obtained from step (1) into a sealed container, vacuuming the sealed container, heating the dried product to a temperature of 600° C. to 1,000° C. and holding the dried product at the temperature for 2 h to 5 h to obtain a heated product, and
   filling the sealed container with 1 MPa to 10 MPa of hydrogen and holding the heated product for 2 h to 5 h to obtain a product; and
   step (3):
   adding the product obtained from step (2) and dibutyl magnesium into an organic solvent to obtain a mixture,
   subjecting the mixture to ultrasonic dispersion to obtain a dispersion mixture,
   heating the dispersion mixture under stirring at a hydrogen pressure of 3 MPa to 6 MPa and a temperature of 180° C. to 220° C. for 12 h to 48 h to obtain a heated dispersion mixture, and
   centrifuging and drying the heated dispersion mixture to obtain the composite loaded with nano-magnesium hydride.

\* \* \* \* \*